(12) United States Patent  (10) Patent No.: US 9,321,179 B2
Inoue  (45) Date of Patent: Apr. 26, 2016

(54) WRIST STRUCTURE OF INDUSTRIAL ROBOT

(71) Applicant: Fanuc Corporation, Yamanashi (JP)

(72) Inventor: Toshihiko Inoue, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/263,365

(22) Filed: Apr. 28, 2014

(65) Prior Publication Data

US 2014/0318298 A1 Oct. 30, 2014

(30) Foreign Application Priority Data

Apr. 30, 2013 (JP) ................................. 2013-095101

(51) Int. Cl.
*F16H 1/14* (2006.01)
*F16H 37/06* (2006.01)
*B25J 17/02* (2006.01)
*B25J 9/10* (2006.01)

(52) U.S. Cl.
CPC *B25J 17/02* (2013.01); *B25J 9/103* (2013.01); *B25J 17/0283* (2013.01); *F16H 1/145* (2013.01); *F16H 37/06* (2013.01); *Y10S 901/29* (2013.01); *Y10T 74/20317* (2015.01)

(58) Field of Classification Search
CPC ............ B25J 17/02; F16H 1/14; F16H 1/145; F16H 37/06
USPC ............... 74/490.01, 490.03, 490.05, 490.06; 901/27–29
See application file for complete search history.

(56) References Cited

U.S. PATENT DOCUMENTS

| | | | | | |
|---|---|---|---|---|---|
| 4,507,046 | A | * | 3/1985 | Sugimoto et al. | 414/735 |
| 4,683,772 | A | * | 8/1987 | Colimitra | 74/490.01 |
| 4,807,486 | A | * | 2/1989 | Akeel et al. | 74/490.06 |
| 4,843,904 | A | * | 7/1989 | Moore | 74/396 |
| 4,972,735 | A | * | 11/1990 | Torii et al. | 74/665 M |
| 5,456,132 | A | * | 10/1995 | Iwanaga et al. | 74/490.06 |
| 5,735,627 | A | * | 4/1998 | Nagao et al. | 403/38 |
| 5,924,330 | A | * | 7/1999 | Danielsson et al. | 74/490.06 |
| 7,028,578 | B2 | * | 4/2006 | Uematsu et al. | 74/490.05 |
| 8,347,753 | B2 | * | 1/2013 | Larsson | 74/490.01 |
| 8,534,155 | B2 | * | 9/2013 | Long | 74/490.06 |
| 8,714,046 | B2 | * | 5/2014 | Amparore et al. | 74/490.06 |
| 8,833,196 | B2 | * | 9/2014 | Furuichi et al. | 74/490.01 |
| 2008/0034920 | A1 | * | 2/2008 | Inoue et al. | 74/665 M |
| 2012/0266720 | A1 | * | 10/2012 | Oka et al. | 74/665 H |

FOREIGN PATENT DOCUMENTS

JP 05-158399 6/1993
JP 4-233578 B 12/2008

* cited by examiner

*Primary Examiner* — William Kelleher
*Assistant Examiner* — Bobby Rushing, Jr.
(74) *Attorney, Agent, or Firm* — RatnerPrestia

(57) ABSTRACT

A wrist structure of an industrial robot including a second wrist power transmission part transmitting power of a second wrist motor to a second wrist element and a third wrist power transmission part transmitting power of a third wrist motor to a third wrist element. The second wrist power transmission part includes a hypoid gear set, a drive shaft, a first reduction gear part reducing a speed of rotation from the second wrist motor and transmitting the reduced rotation to the drive shaft, and a second reduction gear part reducing a speed of rotation from the drive shaft and transmitting the reduced rotation to the second wrist small gear, and the third wrist power transmission part includes a hypoid gear set and a third reduction gear part reducing a speed of rotation from the third wrist motor and transmitting the reduced rotation to the third wrist small gear.

5 Claims, 6 Drawing Sheets

WRIST STRUCTURE OF INDUSTRIAL ROBOT

BACKGROUND OF THE INVENTION

1. Field of the Invention

The present invention relates to a wrist structure of an industrial robot which is provided with wrist elements which have three degrees of freedom of rotating motion.

2. Description of the Related Art

In the past, a wrist structure of an industrial robot has been known, which includes a first wrist element, a second wrist element which is supported at a front end part of the first wrist element rotatably, and a third wrist element which is supported at a front end part of the second wrist element rotatably, wherein the powers of the second wrist motor and the third wrist motor which are provided at the first wrist element are transmitted through hypoid gear sets which respectively have pinion gears and ring gears to the second wrist element and the third wrist element. For example, in the wrist structure which is described in Japanese Examined Patent Publication No. 4233578 (JP4233578B), the second wrist motor is arranged at the front end side of the first wrist element than the third wrist motor, and the power of the second wrist motor is input through a set of spur gears to a second wrist pinion gear.

In this regard, in order to drive the second wrist element, a drive torque which is larger than that for driving the third wrist element is required. For this reason, in general, the reduction ratio of the power transmission path from the second wrist motor to the second wrist element is set large. However, in the wrist structure which is described in JP4233578B, the power of the second wrist motor is input through only one set of spur gears to the second wrist pinion gear, so to obtain a sufficient reduction ratio, the hypoid gear set has to be set large in reduction ratio. If making the hypoid gear set large in reduction ratio, there is the problem that the transmission efficiency of the power falls.

SUMMARY OF THE INVENTION

A wrist structure of an industrial robot according to one aspect of the present invention includes a first wrist element extending in a direction of a first axial line and provided rotatably about a first axial line, a second wrist element supported at a front end part of the first wrist element rotatably about a second axial line, a third wrist element supported at a front end part of the second wrist element rotatably about a third axial line, a second wrist motor provided at the first wrist element and having an output shaft extending parallel to the first axial line, a third wrist motor provided at the first wrist element and having an output shaft extending parallel to the first axial line, a second wrist power transmission part transmitting power of the second wrist motor to the second wrist element, and a third wrist power transmission part transmitting power of the third wrist motor to the third wrist element. The third wrist motor is arranged at a front end side of the first wrist element than the second wrist motor. The second wrist power transmission part includes a second wrist hypoid gear set having a second wrist small gear provided at the first wrist element rotatably about an axial line parallel to the first axial line and a second wrist large gear provided at the first wrist element rotatably about the second axial line, the second wrist large gear engaging with the second wrist small gear, a drive shaft provided at a side of the third wrist motor parallel to the first axial line, a first reduction gear part reducing a speed of rotation from the second wrist motor and transmitting the reduced rotation to the drive shaft, and a second reduction gear part reducing a speed of rotation from the drive shaft and transmitting the reduced rotation to the second wrist small gear. The third wrist power transmission part includes a third wrist hypoid gear set having a third wrist small gear provided at the first wrist element rotatably about an axial line parallel to the first axial line and a third wrist large gear provided at the first wrist element rotatably about the second axial line, the third wrist large gear engaging with the third wrist small gear, and a third reduction gear part reducing a speed of rotation from the third wrist motor and transmitting the reduced rotation to the third wrist small gear.

BRIEF DESCRIPTION OF THE DRAWINGS

The objects, features, and advantages of the present invention will become clearer from the following description of embodiments in relation to the attached drawings, in which.

DETAILED DESCRIPTION

Figure 1:
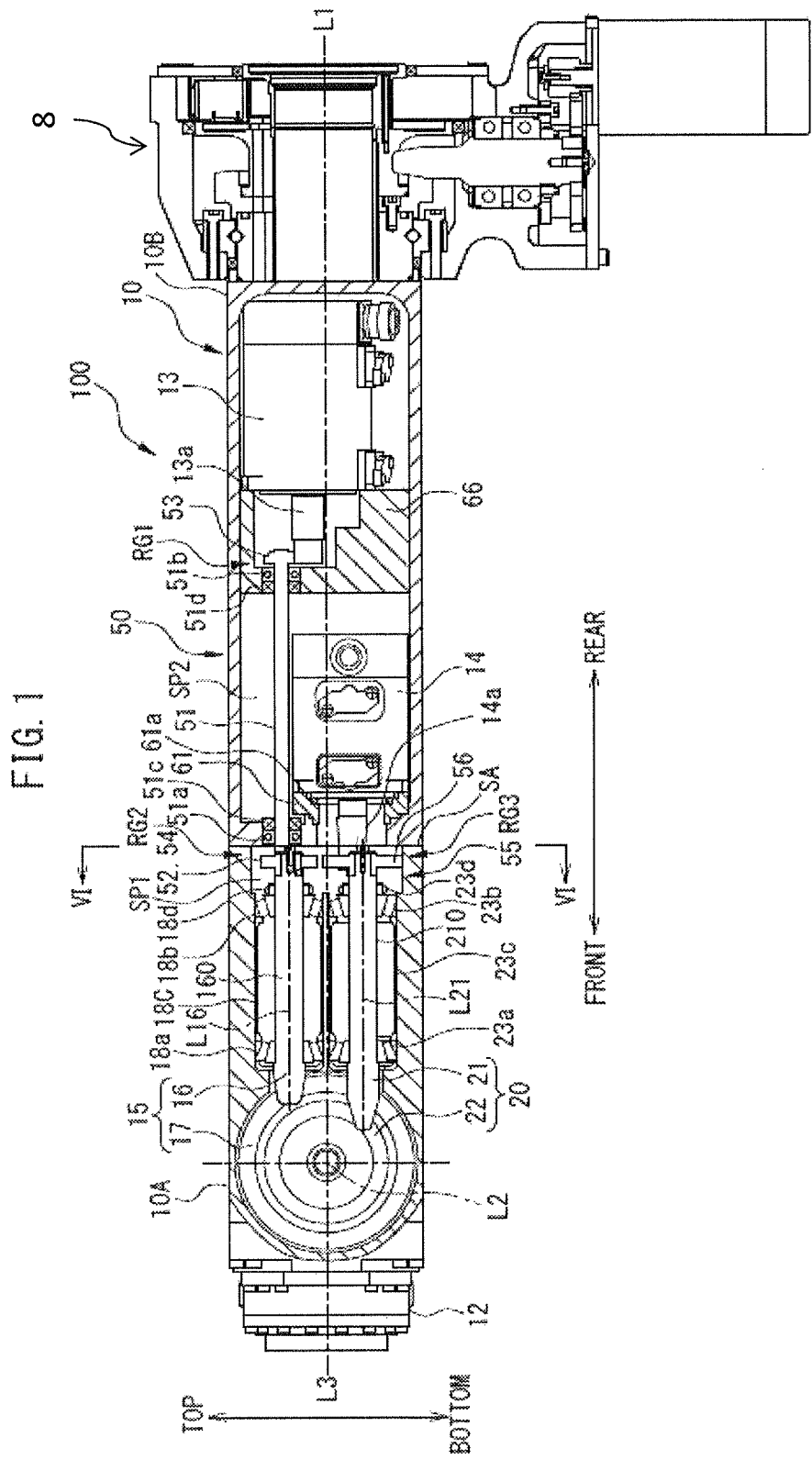
FIG. 1 is a front view which shows an internal configuration of a wrist structure of an industrial robot according to an embodiment of the present invention.
Figure 2:
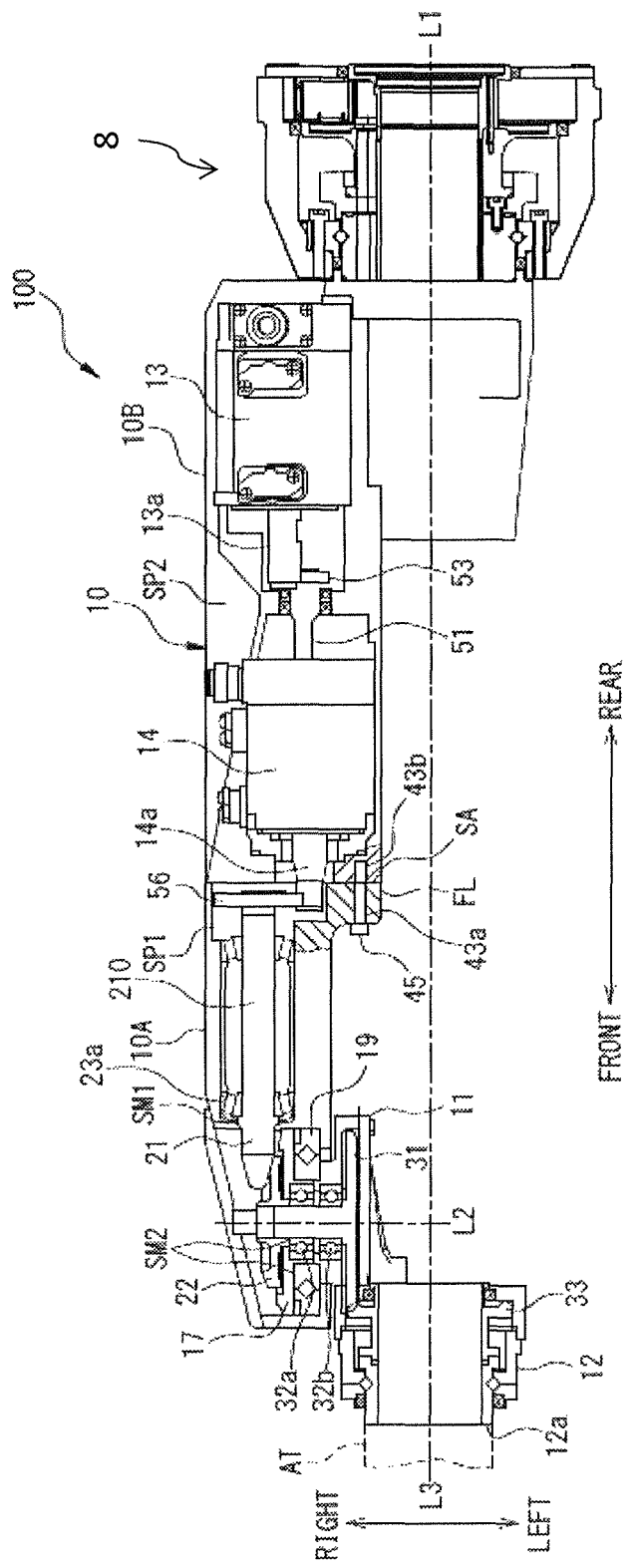
FIG. 2 is a side view which shows an internal configuration of a wrist structure of an industrial robot according to an embodiment of the present invention.
Figure 3:
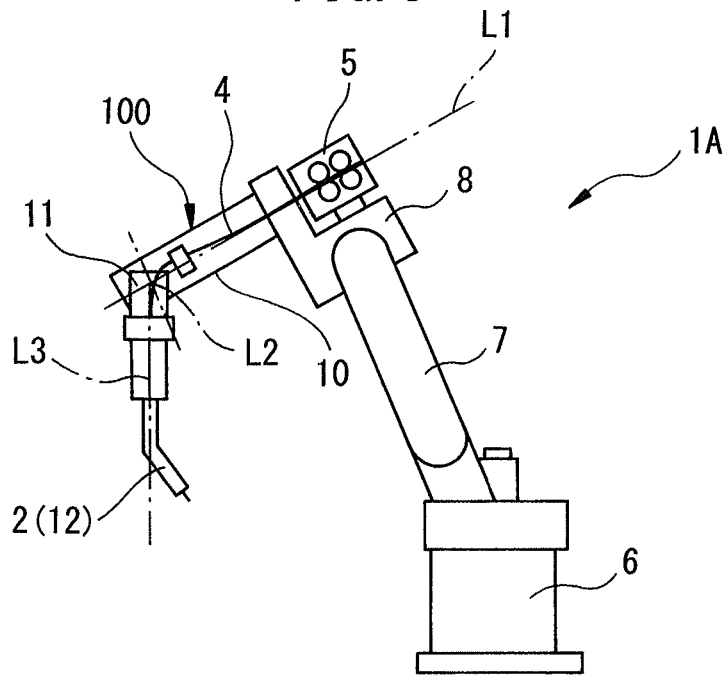
FIG. 3 is a side view which shows an example of an industrial robot to which a wrist structure according to an embodiment of the present invention is applied.
Figure 4:
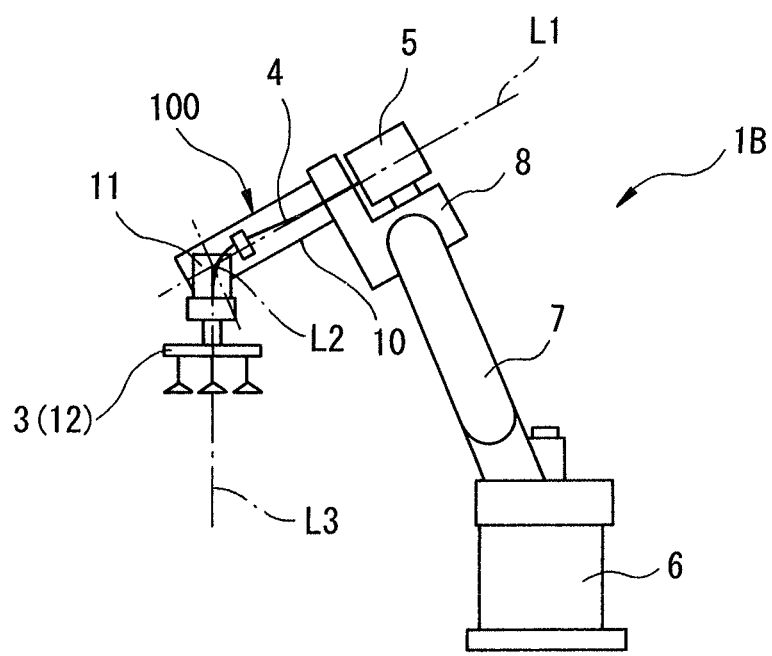
FIG. 4 is a side view which shows an example of an industrial robot to which a wrist structure according to an embodiment of the present invention is applied.

Below, FIG. 1 to FIG. 9 will be referred to to explain embodiments of the present invention. FIG. 1 and FIG. 2 respectively are a front view and side view which show the internal configuration of a wrist structure of an industrial robot according to an embodiment of the present invention 100. FIG. 3 and FIG. 4 are side views which show examples of industrial robots 1A and 1B to which this wrist structure 100 is applied.

First, the configurations of the industrial robots 1A and 1B will be explained. The industrial robots 1A and 1B shown in FIGS. 3 and 4 are robots which have six degrees of freedom of orthogonal motion. In particular, FIG. 3 shows an arc welding-use robot 1A which is provided with a welding torch 2 as a final axis wrist element, while FIG. 4 shows a handling robot 1B which is provided with a hand tool 3 as a final axis wrist element. As shown in FIG. 3, to the welding torch 2, umbilical members 4 comprised of a signal cable, power cable, welding wire, gas hose, wire conduit, etc. bundled together are connected. On the other hand, as shown in FIG.

4, to the hand tool 3, umbilical members 4 comprised of a signal cable, power cable, air pipe, etc. bundled together are connected.

In FIGS. 3 and 4, a base 6 can rotate about an axial line which extends in an top-bottom direction. The base 6 supports an upper arm 7 rotatably. At a front end part of the upper arm 7, a forearm 8 is supported rotatably. At the front end part of this forearm 8, a wrist structure 100 is supported. The base 6, upper arm 7, and forearm 7 swivel with three degrees of freedom of rotating motion. The industrial robots 1A and 1B of FIGS. 3 and 4 differ in the form of the end effector constituted by the third wrist element 12, the configuration of the umbilical members 4 which are connected to the third wrist element 12, and the structures of the feed devices 5 which feed the umbilical members 4. With the exception of these points, the two are common in the parts. That is, the base 6, upper arm 7, and forearm 8 are the same in configurations between the two.

The wrist structure 100 is comprised of a first wrist element 10, a second wrist element 11, and a third wrist element 12 and has three degrees of freedom of rotating motion. The first wrist element 10 is supported at the front end part of the forearm 8 rotatably about a first axial line L1 which extends in the longitudinal direction. The second wrist element 11 is supported at the front end part of the first wrist element 10 rotatably about a second axial line L2 which perpendicularly intersects the first axial line L1. The third wrist element 12 is supported at the front end part of the second wrist element 11 rotatably about a third axial line L3 which perpendicularly intersects the second axial line L2.

The first axial line L1, the second axial line L2, and the third axial line L3 intersect at a single point. The wrist structure 100 is configured as an in-line wrist. Due to this, as shown in FIG. 2, the first axial line L1 and the third axial line L3 are positioned on the same axial line and the interference radius of the other wrist elements 11 and 12 at the time of rotation of the first wrist element 10 can be reduced. Further, a wrist structure 100 with good rotational balance and good controllability can be realized. The individual drive elements which form the above industrial robots 1A and 1B are driven by servo motors corresponding to the individual drive elements. The servo motors are controlled in accordance with commands from a not shown robot control device. Due to this, the robots 1A and 1B can be given predetermined positions and postures.

Next, the configuration of the wrist structure 100 will be explained. Below, for convenience in explanation, as shown in FIGS. 1 and 2, the top-bottom direction, front-rear direction, and left-right direction will be defined and the configurations of the parts will be explained in accordance with these definitions. As shown in FIGS. 1 and 2, the first wrist element 10 extends in the front-rear direction and a rear end part of the first wrist element is supported at the front end part of the forearm 8 rotatably. The forearm 8 is provided with a not shown servo motor and reduction mechanism to rotate the first wrist element 10 reduced by a predetermined reduction ratio. The reduction mechanism is housed in the forearm 8 so that its output part rotates coaxially with the first axial line L1. The first wrist element 10 is driven to rotate about the first axial line L1 through the reduction mechanism.

The first wrist element 10 has a front side case 10A and a rear side case 10B which are fastened together at attachment surfaces SA which extend in a vertical direction perpendicular to the first axial line L1. Inside the cases 10A and 10B, storage spaces SP1 and SP2 are formed. At a rear side storage space SP2, a servo motor 13 which drives the second wrist element 11 and a servo motor 14 which drives the third wrist element 12 are arranged. The servo motor 14 is arranged at the front side of the servo motor 13.

The servo motors 13 and 14 have output shafts 13a and 14a which stick out in parallel to the first axial line L1 toward the front. The servo motor 13 is positioned higher than the servo motor 14, so the output shaft 13a extends above the first axial line L1 while the output shaft 14a extends below the first axial line L1. In other words, the output shafts 13a and 14a of the servo motors 13 and 14 are positioned offset so that they are substantially plane-symmetrical relative to a plane which includes the first axial line L1 and the second axial line L2. The servo motors 13 and 14 are arranged in parallel at the two sides of the plane which includes the first axial line L1 and the second axial line L2 in a state offset to the front and rear and in a state partially overlapped.

By arranging the second wrist motor 13 at the base end side (rear side) of the first wrist element 10 and arranging the third wrist motor 14 at the front end side (front side) of the first wrist element 10 in this way, it is possible to arrange the two motors 13 and 14 partially overlapping when seen from the first axial line L1 direction (front or rear). Due to this, it is possible to keep small the axially perpendicular cross-sectional area of the first wrist element 10 vertical to the first axial line L1.

In a front side storage space SP1, a hypoid gear set 15 which reduces the rotational speed of the servo motor 13 by a predetermined reduction ratio and a hypoid gear set 20 which reduces the rotational speed of the servo motor 14 by a predetermined reduction ratio are provided. The hypoid gear sets 15 and 20 respectively have pinion gears (drive side small gears) 16 and 21 which are driven to rotate by the servo motors 13 and 14 and ring gears (driven side large gears) 17 and 22 which engage with the pinion gears 16 and 21.

The pinion gear 16 is provided at the front end part of a shaft 160 which extends in the front-rear direction above the first axial line L1, while the pinion gear 21 is provided at the front end part of a shaft 210 which extends parallel to the first axial line L1 below the first axial line L1. The pinion gear 16 (shaft 160) is supported via bearings 18a and 18b (conical roller bearings) which are provided at the two front-rear end parts and a needle bearing 18c which is interposed between the bearings 18a and 18b at the front side case 10A rotatably about an axial line L16 parallel to the first axial line L1. Similarly, the pinion gear 21 (shaft 210) is also supported via bearings 23a and 23b (conical roller bearings) which are provided at the two front-rear end parts and a needle bearing 23c which is interposed between the bearings 23a and 23b at the front side case 10A rotatably about an axial line L21 parallel to the first axial line L1.

The bearings 18a and 18b and the bearings 23a and 23b are preloaded by the bearing nuts 18d and 23d in the axial directions. The rotational precisions of the pinion gears 16 and 21 are kept in the best conditions while the pinion gears 16 and 21 are supported rotatably. By providing the needle bearings 18c and 23c between the front-rear pairs of bearings 18a and 18b and 23a and 23b, even when an external force which exceeds the preload acts and stable support by the bearings 18a and 18b and 23a and 23b becomes difficult, the needle bearings 18c and 23c can be used to support the pinion gears 16 and 21 well. Instead of the needle bearings 18c and 23c, it is also possible to use sleeves.

At the front end part of the front side case 10A, a ring gear 17 with which the pinion gear 16 engages and a ring gear 22 with which the pinion gear 21 engages are provided rotatably about the second axial line L2. The ring gear 17 is larger in diameter than the ring gear 22. At the right of the ring gear 17, the ring gear 22 is arranged. The pinion gear 16 is formed with teeth which are twisted in the right direction, while the pinion gear 21 is formed with teeth which are twisted in a direction different from the pinion gear 16 (left direction). In this way, the two pinion gears 16 and 21 are symmetric in tooth shapes, i.e., are formed in opposite directions from each other, so it is possible to arrange the two pinion gears 16 and 21 at positions offset symmetrically in the axially perpendicular direction vertical to the second axial line L2.

As shown in FIG. 2, the positional relationships between the pinion gears 16 and 21 and the ring gears 17 and 22 are adjusted by shims. That is, the shims SM1 which are arranged at the front sides of the bearings 18a and 23a are used to adjust the positions of the pinion gears 16 and 21 in the front-rear direction, while the shims SM2 which are arranged at the right of the bearing 19 and the bearing 32a is used to adjust the positions of the ring gears 17 and 22 in the left-right direction. Due to this, it is possible to adjust the backlashes and teeth contacts of the pinion gears 16 and 21 and ring gears 17 and 22.

The ring gear 17 is integrally connected with the second wrist element 11. The ring gear 17 is supported through the bearing 19 at the inside of the first wrist element 10 rotatably. Due to rotation of the ring gear 17, the second wrist element 11 is driven to rotate about the second axial line L2.

The second wrist element 11 is provided with a bevel gear 31 about the second axial line L2 as the center of rotation. The shaft of the bevel gear 31 extends along the second axial line L2 in the left-right direction. At this shaft, the inner circumferential surface of the ring gear 22 is connected by spline coupling. The shaft of the bevel gear 31 is supported through the left-right pair of bearings 32a and 32b at the inside of the ring gear 17 rotatably. The bevel gear 31 rotates about the second axial line L2 integrally with the ring gear 22.

The third wrist element 12 is provided with a bevel gear 33 about the third axial line L3 as the center of rotation. The bevel gear 33 engages with the bevel gear 31. Rotation of the ring gear 22 causes the bevel gear 33 to rotate through the bevel gear 31. Due to this, the third wrist element 12 is driven to rotate about the third axial line L3. The outside diameter of the bevel gear 31 is larger than the outside diameter of the bevel gear 33. When power is transmitted from the bevel gear 31 to the bevel gear 33, the rotational speed of the bevel gear 33 is increased.

At the front end part of the third wrist element 12, an attachment surface 12a is formed. At the attachment surface 12a, an attachment AT corresponding to the nature of the work (in FIG. 3, a welding torch 2, in FIG. 4, a hand tool 3, etc.) is detachably attached. The wrist structure 100 of the present embodiment has three degrees of freedom, so the position and posture of the attachment AT can be freely changed. In this case, the distance from the second axial line L2 to the center of the attachment AT is longer than the distance from the third axial line L3 to the center of the attachment AT, so to drive the second wrist element 11, a drive torque larger than that for driving the third wrist element 12 becomes necessary. That is, the reduction ratio of the second wrist motor 13 has to be increased. If trying to obtain this reduction ratio by only the hypoid gear set 15, the reduction ratio of the hypoid gear set 15 would become larger and the transmission efficiency of the power would fall. Considering this point, in the present embodiment, the wrist structure 100 is configured as follows.

As shown in FIG. 1, the wrist structure 100 has a second wrist power transmission part 50 which transmits power of the second wrist servo motor 13 to the second wrist element 11 and a third wrist power transmission part 55 which transmits power of the third wrist servo motor 14 to the third wrist element 12.

The second wrist power transmission part 50 has a hypoid gear set 15, a first reduction gear part RG1 and a second reduction gear part RG2 which are provided between the servo motor 13 and the hypoid gear set 15. Above the servo motor 14, a drive shaft 51 extends in the front-rear direction. At the two front-rear end parts of the drive shaft 51, spur gears 52 and 53 are attached. The drive shaft 51 is supported at the rear side case 10B through the front-rear pair of bearings 51a and 51b rotatably about an axial line parallel to the first axial line L1. At the rear of the bearing 51a and at the front of the bearing 51b, oil seals 51c and 51d are provided. Lubrication oil of the bearings 51a and 51b is prevented from entering the servo motor 14 side.

The spur gear 53 engages with the output shaft 13a of the servo motor 13, whereby rotation of the servo motor 13 is transmitted through the spur gear 53 to the drive shaft 51. The spur gear 53 is larger in diameter than the output shaft 13a. The output shaft 13 and the spur gear 53 form the first reduction gear part RG1. The rotation from the servo motor 13 is reduced in speed by the first reduction gear part RG1 by a predetermined reduction ratio, whereby the drive shaft 51 rotates by a lower speed than the servo motor 13.

The front end part of the drive shaft 51 sticks out into the front side case 10A, so the spur gear 52 is arranged inside of the front side case 10A. At the rear end part of the shaft 160 of the pinion gear 16, a spur gear 54 is attached rotatably about the axial line L16. The spur gear 52 is engaged with the spur gear 54, whereby the rotation of the drive shaft 51 is transmitted through the spur gears 52 and 54 to the pinion gear 16. The spur gear 54 is larger in diameter than the spur gear 52, while the spur gears 52 and 54 form the second reduction gear part RG2. The rotation from the drive shaft 51 is reduced in speed by the second reduction gear part RG2 by a predetermined reduction ratio, whereby the pinion gear 16 rotates by a lower speed than the drive shaft 51.

In this way, the rotation of the second wrist servo motor 13 is transmitted through the two sets of reduction gear parts RG1 and RG2 to the pinion gear 16. Due to this, it is possible to rotate the second wrist element 11 by a predetermined drive torque without increasing the reduction ratio of the hypoid gear set 15 that much. For example, the reduction ratios of the first reduction gear part RG1 and the second reduction gear part RG2 can be respectively set to 1:1.5 to 1:4, while the reduction ratio of the hypoid gear set 15 can be set to 1:8 to 1:20. For the proportions of the reduction ratios of the first reduction gear part RG1 and the second reduction gear part RG2, the optimum values should be selected based on the structures of the locations mounted at. For example, the first reduction gear part RG1 can be set to 1:1.5, while the second reduction gear part RG2 can be set to 1:4. As a result, the reduction ratio of the hypoid gear set 15 can be kept to 20 or less. That is, the reduction ratio of the hypoid gear set 15 can be prevented from becoming excessive and the transmission efficiency can be prevented from dropping.

The third wrist power transmission part 55 has a hypoid gear set 20, a pair of bevel gears 31 and 33, and a third reduction gear part RG3 which is provided between the servo motor 14 and the hypoid gear set 20. At the rear end part of the shaft 210 of the pinion gear 21, a spur gear 56 is attached rotatably about an axial line L21. The spur gear 56 is engaged with the output shaft 14a of the servo motor 14, whereby rotation of the servo motor 14 is transmitted through the spur gear 56 to the pinion gear 21. The spur gear 56 is larger in diameter than the output shaft 14a. The output shaft 14a and the spur gear 56 form the third reduction gear part RG3. The rotation from the servo motor 14 is reduced in speed by the third reduction gear part RG3 by a predetermined reduction ratio, and the pinion gear 21 rotates at a lower speed than the servo motor 14.

The rotation of the third wrist servo motor 14 is transmitted through the one set of the reduction gear part RG3 to the pinion gear 21. The distance between the third axial line L3 and the center axis of the attachment AT is small, and the third wrist element 12 does not require a drive torque as large as the second wrist element 11. For this reason, even with the single set of the reduction gear part RG3, it is possible to rotate the third wrist element 12 by a predetermined drive torque without increasing the reduction ratio of the hypoid gear set 20 that much. For example, the third reduction gear part RG3 can be set to a reduction ratio of 1:3 to 1:5 and the hypoid gear set 15 can be set to a reduction ratio of 1:10 to 1:20. As a result, the hypoid gear set 15 can be kept to a reduction ratio of 20 or less. That is, the hypoid gear set 20 can be prevented from becoming excessive in reduction ratio and the transmission efficiency can be prevented from dropping.

Figure 5:
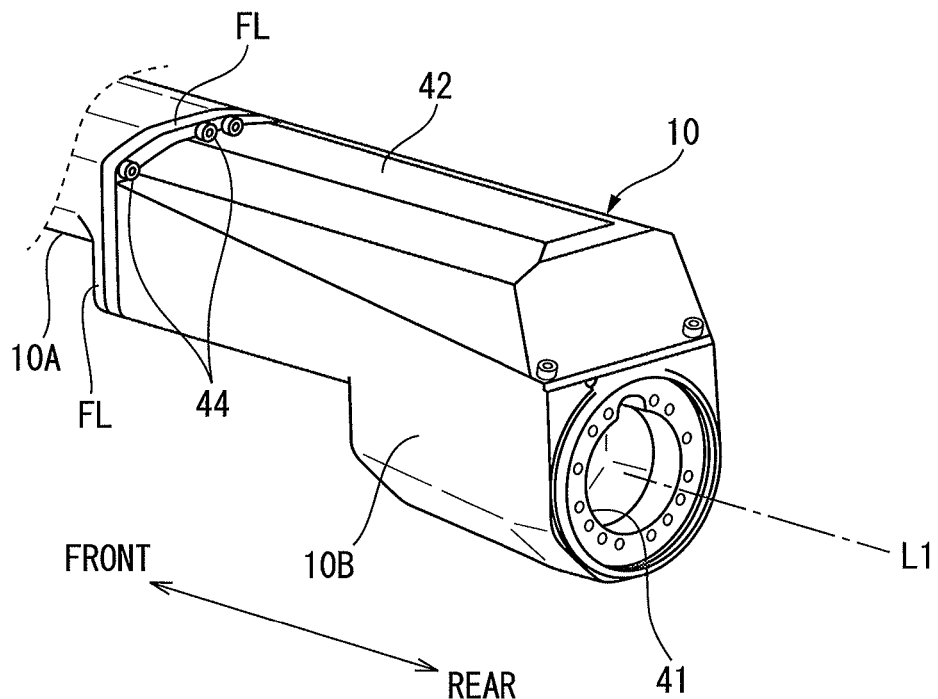
FIG. 5 is a perspective view of a first wrist element which forms part of a wrist structure according to an embodiment of the present invention as seen from the rear at a slant.

FIG. 5 is a perspective view of the first wrist element 10 as seen from the rear at a slant. As shown in FIG. 5, at the rear end part of the first wrist element 10 (rear side cover 10B), a through hole 41 is formed along the first axial line L1. At the rear of the through hole 41, a not shown reduction mechanism is arranged for reducing the speed of rotation from the first wrist element 10. At an output part of the reduction mechanism, a hollow hole is formed. In the hollow hole, control cables which connect to the connectors of the servo motors 13 and 14 are inserted. Due to this, when the first wrist element 10 rotates about the first axial line L1, twisting of the cables is absorbed, and disconnecting and other damage to the cables can be prevented. At the first wrist element 10, a detachable cover 42 is attached. By removing the cover 42, it is possible to easily attach and detach the control cables to and from the connectors of the servo motors 13 and 14.

For example, as shown in FIG. 4, the umbilical members 4 connected to the hand tool 3 which corresponds to the third wrist element 12 can be laid along the control cable, and connectors provided at the end parts of the umbilical members 4 can be connected to a connector of the wrist flange of the third wrist element 12. Due to this, the umbilical members 4 which are arranged along the wrist elements 10 to 12 can be prevented from being exposed to the outside. Therefore, the umbilical members 4 can be stabilized in behavior, and an arranged structure of the umbilical members 4 with a small interference radius can be realized.

Figure 6:
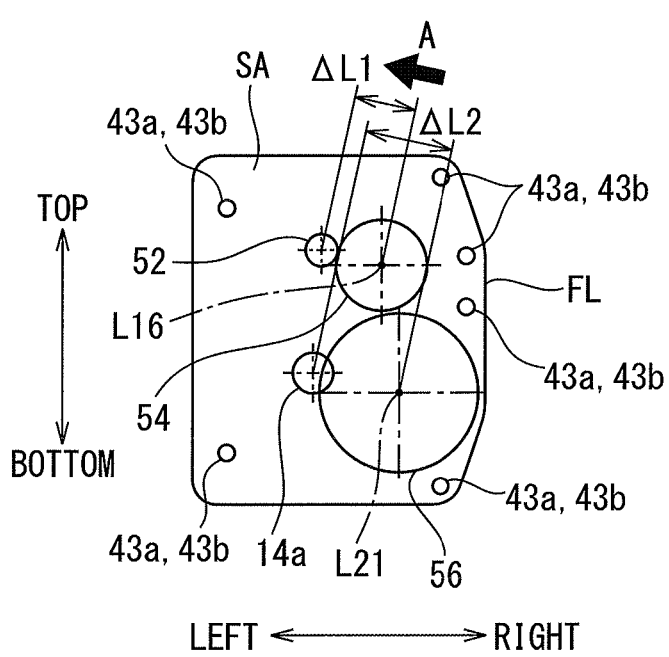
FIG. 6 is a cross-sectional view along the line VI-VI of FIG. 1.

FIG. 6 is a view which shows the configuration of the attachment surfaces SA of the front and rear cases 10A and 10B of the first wrist element 10 (cross-sectional view along line VI-VI in FIG. 1) and shows the positional relationship of the spur gear 52 and spur gear 54 and the positional relationship of the output shaft 14a of the servo motor 14 and spur gear 56. As shown in FIG. 6, the small diameter spur gear 52 which forms the second reduction gear part RG2 is arranged at the left of the large diameter spur gear 54, while the small diameter output shaft 14a which forms the third reduction gear part RG3 is arranged at the left of the large diameter spur gear 56. Further, the spur gear 52 and the spur gear 54 are arranged above the output shaft 14a and the spur gear 56, while the axial line L21 of the spur gear 56 is offset to the right from the axial line L16 of the spur gear 54.

As shown in FIGS. 5 and 6 and the later mentioned FIG. 9, the front end part of the rear side case 10B and the rear end part of the front side case 10A are respectively provided with flange parts FL. One flange part FL is formed with through holes 43a, while the other flange part FL is formed with screw holes 43b (female thread). That is, the right end part of the rear side case 10B and the left part of the front side case 10A are formed with through holes 43a, while corresponding to the through holes 43a, the right end part of the front side case 10A and the left end part of the rear side case 10B are formed with screw holes 43b.

Figure 9:
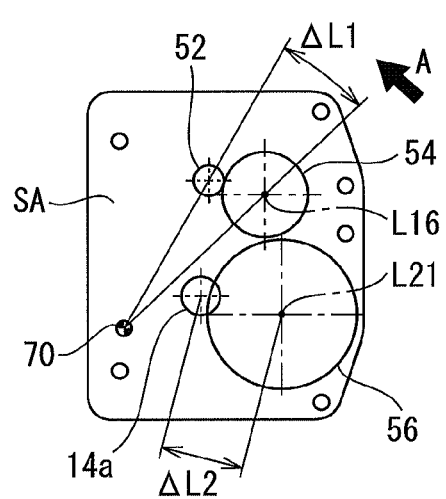
FIG. 9 is a view which shows a modification of FIG. 6.
Figure 9:
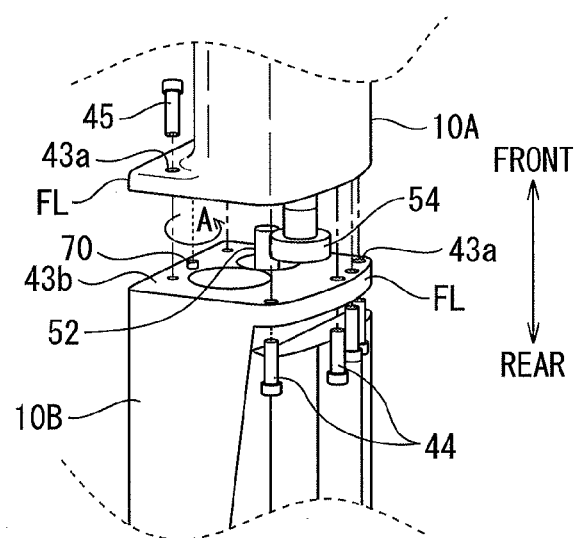

As shown in FIGS. 5 and 9, bolts 44 are inserted through the right side through holes 43a from the rear. The bolts 44 are screwed into the screw holes 43b. As shown in FIGS. 2 and 9, bolts 45 are inserted through the left side through holes 43a from the front. The bolts 45 are screwed into the screw holes 43b. Due to this, the front side case 10A is fastened to the rear side case 10B. The diameters of the through holes 43a are larger than the diameters of the bolts 44 and 45, so the front side case 10A can move with respect to the rear side case 10B along the attachment surfaces SA by the amount of clearance between the bolts 44 and 45 and the through holes 43a in the diametrical direction.

As a result, as shown in FIG. 6, for example, it is possible to move the rear side case 10B relative to the front side case 10A in the arrow A direction. Due to this, it is possible to adjust the distance ΔL1 between centers of the spur gear 54 which is supported at the front side case 10A and the spur gear 52 which is supported at the rear side case 10B and the distance ΔL2 between centers of the spur gear 56 which is supported at the front side case 10A and the output shaft 14a of the servo motor 14 which is supported at the rear side case 10B. Since the distances ΔL1 and ΔL2 between centers can be adjusted in this way, the backlashes at the second reduction gear part RG2 and the third reduction gear part RG3 can be reduced. Here, by precisely arranging the positions of the output shaft 14a of the servo motor 14 and the spur gears 52, 54, and 56 on the attachment surfaces SA of the front and rear cases 10A and 10B of the first wrist element 10 and precisely forming the output shaft 14a of the servo motor 14 and the spur gears 52, 54, and 56, it is possible to precisely set a relative position of the front case 10A and the rear case 10B of the first wrist element 10 and possible to maintain the dimensional precision relative to kinematics of the robot.

Figure 7:
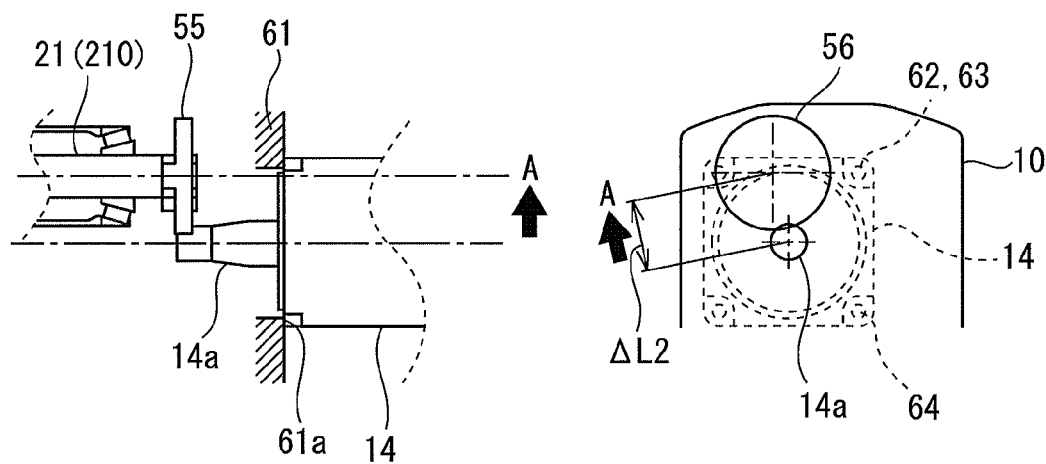
FIG. 7 is a view which shows the configuration of an attachment part of the third wrist servo motor which forms part of the wrist structure according to an embodiment of the present invention.

According to the wrist structure 100 of the present embodiment, it is possible to individually adjust attachment positions of the servo motors 13 and 14. FIG. 7 is a view which shows the configuration of the attachment part of the third wrist servo motor 14, while FIG. 8 is a view which shows the configuration of the attachment part of the second wrist servo motor 13.

As shown in FIGS. 1 and 7, the rear side case 10B is provided with a motor support part 61, while the rear end part of the motor support part 61 is formed with a support surface 61a vertical to the first axial line L1. The front end flange part of the servo motor 14 is formed with through holes 62, while the motor support part 61 is formed with screw holes 63 corresponding to the through holes 62. The servo motor 14 is attached to the support surface 61a by bolts 64 which are passed through the through holes 62 and screwed into the screw holes 63. Between the bolts 64 and the through holes 62, there is clearance in the diametrical direction. The servo motor 14 can move along the support surface 61a by the amount of this clearance. Due to this, for example, it is possible to move the servo motor 14 relative to the rear side case 10B in the arrow A direction of FIG. 7. As a result, it is possible to adjust the distance ΔL2 between the centers of the output shaft 14a of the servo motor 14 and the spur gear 56 which is supported at the front side case 10A, and possible to reduce the backlash at the third reduction gear part RG3.

Figure 8:
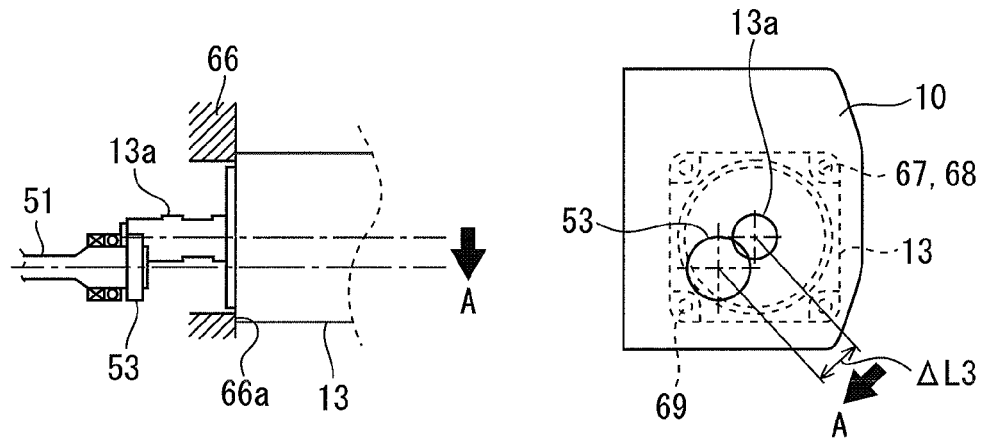
FIG. 8 is a view which shows the configuration of an attachment part of the second wrist servo motor which forms part of the wrist structure according to an embodiment of the present invention.

As shown in FIGS. 1 and 8, the rear side case 10B is provided with a motor support part 66 at the rear of the motor support part 61, while the rear end part of the motor support part 66 is formed with a support surface 66a vertical to the first axial line L1. The front end flange part of the servo motor 13 is formed with through holes 67, while the motor support part 66 is provided with screw holes 68 which correspond to the through holes 67. The servo motor 13 is attached to the support surface 66a by bolts 69 which are passed through the through holes 67 and screwed into the screw holes 68. Between the bolts 69 and the through holes 67, there is clearance in the diametrical direction. The servo motor 13 can move along the support surface 66a by that clearance. Due to this, for example, it is possible to move the servo motor 13 in the arrow A direction of FIG. 8 relative to the rear side case 10B. As a result, it is possible to adjust the distance ΔL3 between centers of the spur gear 53 which is provided at the drive shaft 51 and the output shaft 13a of the servo motor 13, and possible to reduce the backlash at the first reduction gear part RG1.

FIG. 9 is a view which shows a modification of FIG. 6. In FIG. 9, the attachment surfaces SA of the front-rear cases 10A and 10B of the first wrist element 10 are provided with a positioning pin 70. The positioning pin 70 fits in positioning holes which are provided in the front and rear cases 10A and 10B without clearance, and thereby positions the front side case 10A with respect to the rear side case 10B. At this time, the front side case 10A can pivot on the attachment surface SA about the positioning pin 70 in the arrow A direction of the figure. Due to this, it is possible to adjust the distance ΔL1 between the centers of the spur gear 52 and the spur gear 54, and possible to reduce the backlash at the second reduction gear part RG2. In this case, it is sufficient to adjust the distance ΔL1 between the centers of the spur gears 52 and 54, then, as shown in FIG. 7, to adjust the attachment position of the servo motor 14 so as to adjust the distance ΔL2 between the centers of the output shaft 14a of the servo motor 14 and the spur gear 56. Further, in this case as well, it is possible to accurately set the positions of the output shaft 14a of the servo motor 14 and the spur gear 56 on the attachment surface SA of the front and rear cases 10A and 10B of the first wrist element 10 and precisely form the output shaft 14a of the servo motor 14 and the spur gear 56 so as to accurately position the relative positions between the front and rear cases 10A and 10B of the first wrist element 10.

In the present embodiment, since the reduction ratios of the hypoid gear sets 15 and 20 are made small, the effect of backlash on the reduction gear parts RG1 to RG3 becomes larger and the backlash is liable to detrimentally affect the operating performance of the robot. On this point, as shown in FIG. 6 to FIG. 9, by providing the function of positional adjustment of the reduction gear parts RG1 to RG3, it is possible to keep the backlash to a minimum and possible to improve the transmission efficiencies of the hypoid gear sets 15 and 20 while obtaining excellent operating performance of the robot.

According to the present embodiment, it is possible to exhibit the following such functions and effects.

(1) The wrist structure 100 of the present embodiment has the second wrist servo motor 13, the third wrist servo motor 14 which is arranged further to the front end side (front side) of the first wrist element 10 than the second wrist servo motor 13, the power transmission part 50 which transmits the power of the servo motor 13 to the second wrist element 11, and the power transmission part 55 which transmits the power of the servo motor 14 to the third wrist element 12. The power transmission part 50 has the hypoid gear set 15, the drive shaft 51 which extends at the side of the servo motor 14 parallel to the first axial line L1, the first reduction gear part RG1 which reduces the speed of rotation from the servo motor 13 and transmits the reduced rotation to the drive shaft 51, and the second reduction gear part RG2 which reduces the speed of rotation from the drive shaft 51 and transmits the reduced rotation to the pinion gear 16 of the hypoid gear set 15, while the the power transmission part 55 has the hypoid gear set 20 and the third reduction gear part RG3 which reduces the speed of rotation from the servo motor 14 and transmits the reduced rotation to the pinion gear 21 of the hypoid gear set 20.

Due to this, the rotation from the servo motor 13 is reduced in speed through the two sets of the reduction gear parts RG1 and RG2, so it is possible to drive the second wrist element 11 with a high torque without increasing the reduction ratio of the hypoid gear set 15 that much. On the other hand, although the rotation from the servo motor 14 is reduced in speed through the one set of the reduction gear part RG3, the third wrist element 12 does not require as large a drive torque as the second wrist element 11, so the reduction ratio of the hypoid gear set 20 does not have to be increased that much. As a result, the reduction rates of the hypoid gear sets 15 and 20 can be set to, for example, 20 or less and the transmission efficiencies of the hypoid gear sets 15 and 20 can be raised. Further, the servo motor 13 is arranged at the rear of the servo motor 14 while the drive shaft 51 is arranged at the side of the servo motor 14. Therefore, it is possible to easily and efficiently arrange two sets of reduction gear parts RG1 and RG2 inside the first wrist element 10 without increasing the size of the first wrist element 10. The reduction gear parts RG1 to RG3 are comprised of spur gears, so the reduction gear parts RG1 to RG3 can be raised in transmission efficiency.

(2) The first wrist element 10 has the rear side case 10B which houses the servo motors 13 and 14 and supports the drive shaft 51 rotatably, and the front side case 10A which is attached to the attachment surface SA which is formed at the front end part of the rear side case 10B and which is vertical to the first axial line L1 and supports the hypoid gear sets 15 to 20 rotatably. Due to this, the servo motors 13 and 14 and the drive shaft 51 and the hypoid gear sets 15 and 20 can be easily assembled and arranged in the first wrist element 10. The first wrist element 10 is divided into the front and rear pair of cases 10A and 10B, and the first wrist element 10 has only one divided surface (attachment surfaces SA). Therefore, the first wrist element 10 is improved in assembly ability and sealing ability. Further, the first wrist element 10 has few step parts and is good in appearance from the outside.

(3) The front and rear cases 10A and 10B are fastened together by screwing bolts 44 and 45 which are passed through the through holes 43a to the screw holes 43b (FIG. 6). Due to this, positional adjustment of the front side case 10A with respect to the rear side case 10B on the attachment surface SA vertical to the first axial line L1 is possible, and backlashes of the second reduction gear part RG2 and the third reduction gear part RG3 can be easily reduced.

(4) When fitting the positioning pin 70 at the attachment surfaces SA, the front side case 10A can pivot about the positioning pin 70 with respect to rear side case 10B (FIG. 9). Due to this, positional adjustment between the spur gears 52 and 54 becomes easy and the backlash of the second reduction gear part RG2 can be easily reduced.

(5) The rear side case 10B of the first wrist element 10 is provided with the motor support part 61, and the bolts 64 which are passed through the through holes 62 of the flange part of the servo motor 14 are screwed into the screw holes 63 of the motor support part 61 so as to fasten the servo motor 14 to the support surface 61a vertical to the first axial line L1 (FIG. 7). Due to this, positional adjustment of the servo motor 14 on the support surface 61a becomes possible, and the distance ΔL2 between the centers of the output shaft 14a of the servo motor 14 and the spur gear 56 of the pinion gear 21 can be independently adjusted. Therefore, it is possible to adjust the position of the cases 10A and 10B, then to finely adjust the distance ΔL2 between the centers and possible so as to easily reduce the backlashes of the reduction gear parts RG2 and RG3.

(6) The rear side case 10B of the first wrist element 10 is provided with the motor support part 66 and bolts 69 with are passed through the through holes 67 of the flange part of the servo motor 13 are engaged with the screw holes 68 of the motor support part 66 so as to fasten the servo motor 13 on the support surface 66a vertical to the first axial line L1 (FIG. 8). Due to this, it becomes possible to adjust the position of the servo motor 13 on the support surface 66a and becomes possible to easily reduce the backlash of the reduction gear part RG1.

(7) The power transmission part 55 of the third wrist further has a bevel gear 31 (first bevel gear) which is provided at the second wrist element 11 and which rotates about the second axial line L2 together with the ring gear 22 of the hypoid gear set 20, and a bevel gear 33 (second bevel gear) which is provided at the third wrist element 12 and engages with the bevel gear 31 to rotate about the third axial line L3. The bevel gear 31 has an outside diameter larger than an outside diameter of the bevel gear 33. Due to this, the third wrist element 12 is increased in speed through the bevel gears 31 and 33. Therefore, a rotation number of the hypoid gear set 15 can be kept lower by that amount and the hypoid gear set 15 can be raised in transmission efficiency.

In an above embodiment (FIGS. 1 and 2), the rotation from the servo motor 13 is made to be reduced in speed through the spur gear 53. However, so long as the rotation from the second wrist motor 13 is reduced in speed and transmitted to the drive shaft 51, the first reduction gear part may be configured in any way. In the above embodiment, the rotation from the drive shaft 51 is reduced in speed through the spur gears 52 and 54. However, so long as the rotation from the drive shaft 51 is reduced in speed and transmitted to the pinion gear 16, the second reduction gear part may be configured in any way. In the above embodiment, the rotation from the servo motor 14 is reduced in speed through the spur gear 56. However, so long as the rotation from the third wrist motor 14 is reduced in speed and transmitted to the pinion gear 21, the third reduction gear part may be configured in any way. That is, for example, something other than spur gears may be used to form the first reduction gear part, the second reduction gear part and the third reduction gear part. It is also possible to assemble more gears to form the first reduction gear part, the second reduction gear part and the third reduction gear part. The configurations of the pinion gear 16 (second wrist small gear) and the ring gear 17 (second wrist large gear) which form the second wrist hypoid gear set 15 and the configurations of the pinion gear 21 (third wrist small gear) and ring gear 22 (third wrist large gear) which form the third wrist hypoid gear set 20 are not limited to those which are explained above.

In the above embodiment (FIGS. 1 and 2), the first wrist element 10 is split into the front side case 10A and the rear side case 10B through the attachment surfaces SA vertical to the first axial line L1. However, so long as housing the servo motors 13 and 14 and supporting the drive shaft 51 rotatably, a first case part constituted by the rear side case 10B may be configured in any way, and so long as supporting the hypoid gear sets 15 to 20 rotatably, a second case part constituted by the front side case 10A may be also configured in any way. In the above embodiment (FIGS. 6 and 9), a clearance is provided between the through holes 43a and the bolts 44 and 45 to adjust the position of the front side case 10A with respect to the rear side case 10B on the attachment surface SA. However, for example, it is also possible to make the through holes 43a elongated holes to restrict the direction of relative movement of the cases 10A and 10B, so a case positional adjustment part is not limited to the above configuration.

In an above embodiment (FIGS. 7 and 8), the motor support parts 61 and 66 are provided inside the first wrist element 10 and positions of the servo motors 13 and 14 in the direction vertical to the first axial line L1 are adjusted. However, a motor positional adjustment part is not limited to this configuration. Either of the servo motors 13 and 14 may be adjusted in position by the motor positional adjustment part. In the above embodiment (FIGS. 3 and 4), examples of application of the wrist structure 100 to industrial robots 1A and 1B which are provided with a welding torch 2 or hand tool 3 are explained. However, the wrist structure of the present invention can also be applied to an industrial robot which performs sealing or pickling, etc. or another industrial robot.

The above embodiments may be combined with one or more of the above modifications.

According to the present invention, a rotation from the second wrist motor is transmitted through two sets of reduction gear parts to the hypoid gear set. Therefore, it is possible to generate the drive torque which is necessary for the second wrist element without increasing the reduction ratio of the hypoid gear set and possible to prevent a drop in the transmission efficiency of the power.

Above, the present invention was explained in relation to preferred embodiments, but a person skilled in the art would understand that various corrections and changes may be made without departing from the scope of disclosure of the later set forth claims.

The invention claimed is:
1. A wrist structure of an industrial robot comprising:
a first wrist element extending in a direction of a first axial line and provided rotatably about the first axial line;
a second wrist element supported at a front end part of the first wrist element rotatably about a second axial line;
a third wrist element supported at a front end part of the second wrist element rotatably about a third axial line;
a second wrist motor provided at the first wrist element and having an output shaft extending parallel to the first axial line;
a third wrist motor provided at the first wrist element and having an output shaft extending parallel to the first axial line;
a second wrist power transmission part transmitting power of the second wrist motor to the second wrist element; and
a third wrist power transmission part transmitting power of the third wrist motor to the third wrist element,
wherein the third wrist motor is arranged to be closer to a front end side of the first wrist element than the second wrist motor,
wherein the second wrist power transmission part includes
a second wrist hypoid gear set having a second wrist small gear provided at the first wrist element rotatably about an axial line parallel to the first axial line and a second wrist large gear provided at the first wrist element rotatably about the second axial line, the second wrist large gear engaging with the second wrist small gear,
a drive shaft provided at a side of the third wrist motor, parallel to the first axial line,
a first reduction gear part reducing a speed of rotation from the second wrist motor and transmitting the reduced rotation to the drive shaft, and
a second reduction gear part reducing a speed of rotation from the drive shaft and transmitting the reduced rotation to the second wrist small gear, and wherein the third wrist power transmission part includes
a third wrist hypoid gear set having a third wrist small gear provided at the first wrist element rotatably about an axial line parallel to the first axial line and a third wrist large gear provided at the first wrist element rotatably about the second axial line, the third wrist large gear engaging with the third wrist small gear,
a third reduction gear part reducing a speed of rotation from the third wrist motor and transmitting the reduced rotation to the third wrist small gear, and wherein the first wrist element includes
a first case part housing the second wrist motor and the third wrist motor and supporting rotatably the drive shaft, and
a second case part attached to an attachment surface formed at a front end part of the first case part to support rotatably the second wrist hypoid gear set and the third wrist hypoid gear set, the attachment surface being vertical to the first axial line;

wherein the first case part or the second case part is provided with a clearance such that the first case part can pivot with respect to the second case part on the attachment surface in order to simultaneously adjust the relative positions of the third wrist motor and the third wrist small gear, and the relative positions of the drive shaft and the second wrist small gear.

2. The wrist structure of an industrial robot according to claim 1, wherein the first wrist element has a case positional adjustment part adjusting a position of the second case part with respect to the first case part on the attachment surface.

3. The wrist structure of an industrial robot according to claim 2, wherein
the case positional adjustment part has a positioning pin fitted in the attachment surface and
the second case part is provided rotatably relative to the first case part on the attachment surface about the positioning pin.

4. The wrist structure of an industrial robot according to claim 1, wherein the first wrist element has a motor positional adjustment part adjusting a position of at least one of the second wrist motor and the third wrist motor with respect to the first case part in a direction vertical to the first axial line.

5. The wrist structure of an industrial robot according to claim 1, wherein
the third wrist power transmission part further includes
a first bevel gear provided at the second wrist element to rotate about the second axial line together with the third wrist large gear, and
a second bevel gear provided at the third wrist element to engage with the first bevel gear and rotate about the third axial line, and
the first bevel gear has an outside diameter larger than an outside diameter of the second bevel gear.

\* \* \* \* \*